United States Patent
Broekhuijsen et al.

(10) Patent No.: US 8,825,651 B1
(45) Date of Patent: Sep. 2, 2014

(54) DETERMINING A GROUP OF RELATED PRODUCTS ON A COMPUTING DEVICE

(75) Inventors: Jerome Broekhuijsen, Highland, UT (US); Peter E. Johnson, Lehi, UT (US)

(73) Assignee: Crimson Corporation, Dover, DE (US)

( * ) Notice: Subject to any disclaimer, the term of this patent is extended or adjusted under 35 U.S.C. 154(b) by 274 days.

(21) Appl. No.: 13/173,843

(22) Filed: Jun. 30, 2011

(51) Int. Cl.
*G06F 17/30* (2006.01)

(52) U.S. Cl.
CPC ............... *G06F 17/30705* (2013.01)
USPC ............................................. 707/737

(58) Field of Classification Search
CPC ............................................. G06F 17/30705
USPC .......................... 707/737; 705/59
See application file for complete search history.

(56) References Cited

U.S. PATENT DOCUMENTS

2006/0229994 A1 * 10/2006 Moulckers et al. ............. 705/59
2013/0198734 A1 * 8/2013 Biswas et al. ................. 717/174

* cited by examiner

*Primary Examiner* — Thu-Nguyet Le
(74) *Attorney, Agent, or Firm* — Austin Rapp & Hardman

(57) ABSTRACT

A computing device configured for determining a group of related products is described. The computing device includes a processor and instructions stored in memory that is in electronic communication with the processor. The computing device obtains product data that identifies a first product and a second product. The computing device also obtains license data. The computing device further identifies a relationship between the first product and the second product based on the license data. The computing device additionally determines a group of related products based on the relationship. The computing device also performs an operation based on the group.

20 Claims, 9 Drawing Sheets

DETERMINING A GROUP OF RELATED PRODUCTS ON A COMPUTING DEVICE

TECHNICAL FIELD

The present disclosure relates generally to computers and computer-related technology. More specifically, the present disclosure relates to determining a group of related products on a computing device.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user.

One of the challenges involved with computer technologies is making computer functionality and/or data easily accessible to users. In some cases, however, functionality and/or data may not be directly presentable in a way that is easily accessible to many users. As can be observed from this discussion, systems and methods that improve user accessibility to computer functionality and/or data may be beneficial.

DETAILED DESCRIPTION

Figure 1:
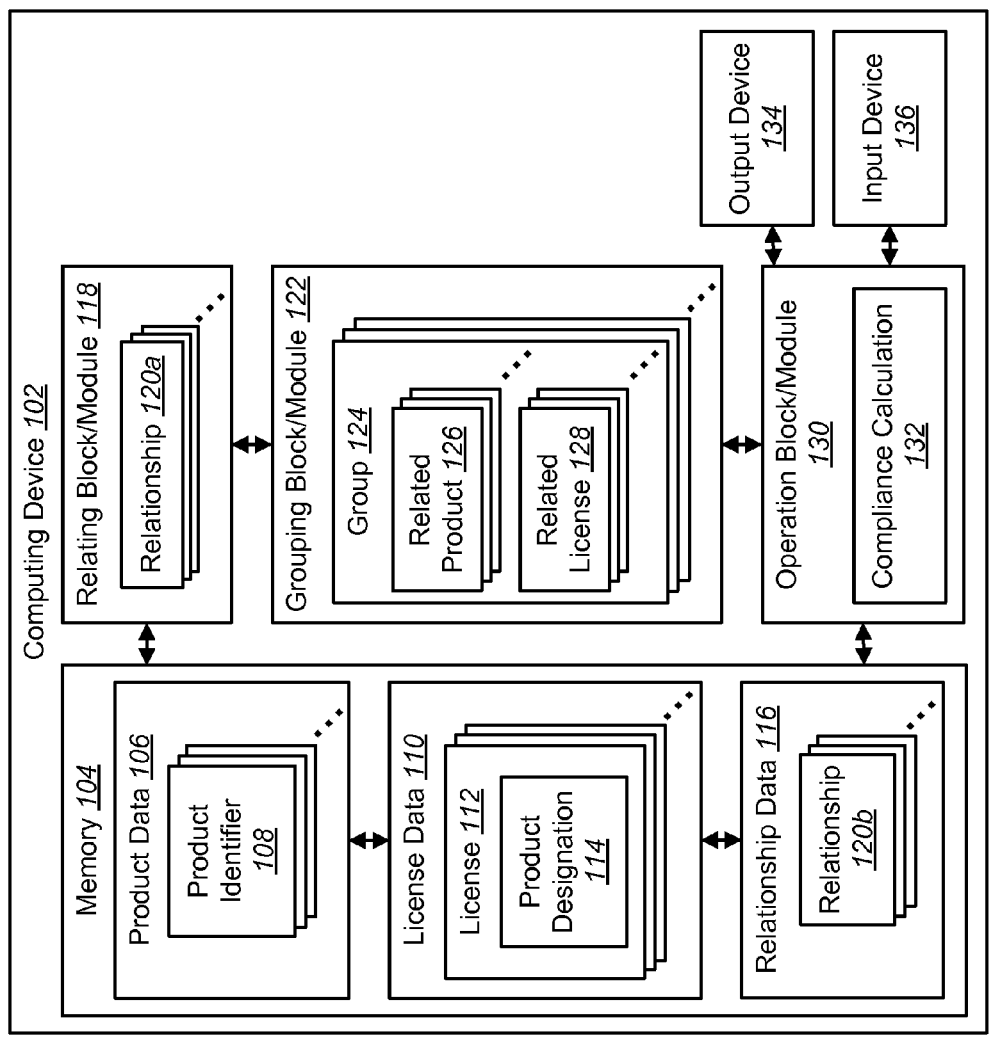
FIG. 1 is a block diagram illustrating one configuration of a computing device in which systems and methods for determining a group based on a relationship may be implemented.

A computing device configured for determining a group of related products is disclosed. The computing device includes a processor and instructions stored in memory that is in electronic communication with the processor. The computing device obtains product data that identifies a first product and a second product. The computing device also obtains license data. The computing device further identifies a relationship between the first product and the second product based on the license data. The computing device additionally determines a group of related products based on the relationship. The computing device also performs an operation based on the group. Performing the operation based on the group may include performing a compliance calculation based on the group. The group may be a licensable unit. The computing device may also perform a Boolean OR operation on the relationship.

Determining the group of related products may include generating an adjacency matrix for identifying related products and generating a connectivity matrix based on the adjacency matrix. Determining the group of related product may also include identifying a unique row of the connectivity matrix and forming a distinct group for each unique row of the connectivity matrix.

Determining the group of related products may include generating an adjacency matrix for identifying related products and generating a connectivity matrix based on the adjacency matrix. Determining the group of related products may also include generating a hash set for storing a hash code for each unique row of the connectivity matrix and determining if the hash code for a row exists in the hash set. Determining the group of related products may further include adding each unique hash code to the hash set. The hash set may identify each unique row of the connectivity matrix. Determining the group of related products may additionally include forming a distinct group for each unique row of the connectivity matrix.

Determining the group of related products may include generating an adjacency matrix for identifying related products and generating a connectivity matrix based on the adjacency matrix. Determining the group of related products may also include sorting the connectivity matrix through row exchanges and corresponding column exchanges to left align values of the connectivity matrix and forming a distinct group for each block of values centered along a main diagonal of the connectivity matrix.

A method for determining a group of related products on a computing device is also disclosed. The method includes obtaining product data that identifies a first product and a second product. The method also includes obtaining license data. The method further includes identifying a relationship between the first product and the second product based on the license data. The method additionally includes determining a group of related products based on the relationship. The method also includes performing an operation based on the group.

A non-transitory, tangible computer-readable medium for determining a group of related products is also disclosed. The computer-readable medium includes executable instructions for obtaining product data that identifies a first product and a second product. The computer-readable medium also includes executable instructions for obtaining license data. The computer-readable medium further includes executable instructions for identifying a relationship between the first product and the second product based on the license data. The computer-readable medium additionally includes executable instructions for determining a group of related products based on the relationship and performing an operation based on the group.

One configuration of the systems and methods described herein may be used for automatically partitioning a set of entities (e.g., products) and associations (e.g., licenses) into distinct groups, where each group may contain only those entities that are related to each other through associations. Each group may contain only those associations which are applicable to entities in that group. Such a partitioning may enable determination of groups of related entities that may be considered as a whole for performing an operation (e.g., when performing license compliance calculations).

In one example, products (e.g., software, hardware) and licenses may be grouped to perform a compliance calculation. Products may be licensed by multiple licenses and licenses may be applied to multiple products. Such a situation creates a many-to-many relationship between the products and the licenses. Performing a compliance calculation for a given product may require knowing what other products are related to the given product through multi-product-covering licenses. Each set of thus related products may constitute a group or "licensable unit." The compliance calculation for a given product may take into consideration the compliance for each of the other products in the associated licensable unit.

One configuration of the systems and methods disclosed herein involves identifying a set of all products covered by a given set of licenses. A graph may be created where vertices correspond to products and edges correspond to license relationships between products. For a given license, an edge may be found between each of the products covered by the given license. Since a product may be covered by more than one license, there may also be edges between a given product and other products to which it is related through other licenses.

One example is given in Table (1), where products are licensed by multiple licenses and licenses may be applied to multiple products.

TABLE 1

| License A | Product A | Product B |         |
|-----------|-----------|-----------|---------|
| License B | Product A |           |         |
| License C | Product C | Product H |         |
| License D | Product A | Product B |         |
| License E | Product A | Product B | Product D |
| License F | Product E |           |         |
| License G | Product E | Product F |         |
| License H | Product D | Product I |         |
| License I | Product D | Product G |         |

The resulting graph may have multiple components, each component being a maximally connected subgraph where, through a finite sequence of edge traversals, each node (e.g., contained product) can reach any other node (e.g., contained product). This determination of subgraphs may effectively partition not only the products but also their associated licenses into distinct groups. The resulting graph and possible subgraphs will be described in further detail below in connection with FIG. 3 and FIG. 4. Each such subgraph may constitute a distinct licensable unit.

Several approaches may be used in accordance with the systems and methods disclosed herein. One such approach may be to utilize a graph to define and represent the relationships between products and licensable units. Another approach may be to utilize a relationship matrix. Still other approaches may be used in other similarly expressive domains.

One such alternative domain for determining these groups (e.g., licensable units) may result from transforming the graph into a square relationship matrix. The rows and columns of the matrix may be labeled by the products, and a '1' (or "True") may mark the intersection of a row corresponding to one product with the column corresponding to another (license-related) product, and a '0' (or "False") may mark the absence of a direct relationship between corresponding products. Single-product licenses may be represented along the main diagonal of this relationship matrix, with 1's at the intersection of the row and the column corresponding to the given product. The resulting matrix may represent an adjacency matrix (indicating direct relationships between products due to individual licenses).

The previous example may be transposed into the matrix domain as illustrated in Table (2) below. Let $A^1$ represent the first power of an Adjacency Matrix as illustrated in Table (2). For convenience, PA, PB and PC, etc., respectively denote Product A, Product B and Product C, etc., in Table (2).

TABLE (2)

|    | PA | PB | PC | PD | PE | PF | PG | PH | PI |
|----|----|----|----|----|----|----|----|----|----|
| PA | 1  | 1  | 0  | 1  | 0  | 0  | 0  | 0  | 0  |
| PB | 1  | 1  | 0  | 1  | 0  | 0  | 0  | 0  | 0  |
| PC | 0  | 0  | 1  | 0  | 0  | 0  | 0  | 1  | 0  |
| PD | 1  | 1  | 0  | 1  | 0  | 0  | 1  | 0  | 1  |
| PE | 0  | 0  | 0  | 0  | 1  | 1  | 0  | 0  | 0  |
| PF | 0  | 0  | 0  | 0  | 1  | 1  | 0  | 0  | 0  |
| PG | 0  | 0  | 0  | 1  | 0  | 0  | 1  | 0  | 0  |
| PH | 0  | 0  | 1  | 0  | 0  | 0  | 0  | 1  | 0  |
| PI | 0  | 0  | 0  | 1  | 0  | 0  | 0  | 0  | 1  |

From this adjacency matrix, a connectivity matrix may be computed by taking the sum of all powers i of the adjacency matrix (for i ranging from 1 to N, where N is the number of products in the matrix (9 in this example)). For example, this may be computed as illustrated in the equation Matrix_Connectivity=$\Sigma$Matrix_Adjacency$^i$, where i ranges from 1 to 9. The result may be illustrated in Table (3) below. For convenience, PA, PB and PC, etc., respectively denote Product A, Product B and Product C, etc., in Table (3).

TABLE (3)

|    | PA | PB | PC | PD | PE | PF | PG | PH | PI |
|----|----|----|----|----|----|----|----|----|----|
| PA | 1  | 1  | 0  | 1  | 0  | 0  | 1  | 0  | 1  |
| PB | 1  | 1  | 0  | 1  | 0  | 0  | 1  | 0  | 1  |
| PC | 0  | 0  | 1  | 0  | 0  | 0  | 0  | 1  | 0  |
| PD | 1  | 1  | 0  | 1  | 0  | 0  | 1  | 0  | 1  |
| PE | 0  | 0  | 0  | 0  | 1  | 1  | 0  | 0  | 0  |
| PF | 0  | 0  | 0  | 0  | 1  | 1  | 0  | 0  | 0  |
| PG | 1  | 1  | 0  | 1  | 0  | 0  | 1  | 0  | 1  |
| PH | 0  | 0  | 1  | 0  | 0  | 0  | 0  | 1  | 0  |
| PI | 1  | 1  | 0  | 1  | 0  | 0  | 1  | 0  | 1  |

This may be equivalent to the transitive closure of the adjacency matrix. The math for matrix multiplication (used in computing powers of matrices) and for matrix addition (used in summing the power matrices) may be simplified by considering that only truth is needed. Consequently, the operation of matrix multiplication may need to only produce a '1' ("True") or '0' ("False") rather than an arithmetic sum of the products for each position in the matrix.

Similarly, operation of matrix addition may need to only produce a '1' ("True") or '0' ("False") (effectively a Boolean OR operation) rather than an arithmetic sum of the values at each position in the matrix.

The computation of the connectivity matrix may be improved through bit-wise intersection functionality provided by existing and commercially available software libraries. For example, in Java, the BitSet class may be used to represent rows in the matrix, thus a matrix may be a sequence of BitSet objects. Matrix multiplication of Matrix_S=Matrix_Q×Matrix_R may involve computing dot products of rows from Matrix_Q with columns of Matrix_R.

For example, this may be expressed as illustrated in the following equation Matrix_$S_{ij}$=Row_$Q_i$·Column_R.

Computing the powers of the adjacency matrix (Matrix_Adjacency) may be done by successively multiplying the previous power matrix (Matrix_Adjacency$^{i-1}$) by the original adjacency matrix (Matrix_Adjacency$^1$) as illustrated in Listing (1).

Matrix_Adjacency$^j$ =

Matrix_Adjacency$^{j-1}$ × Matrix_Adjacency$^1$

Thus,

Matrix_Adjacency$^2$ =

Matrix_Adjacency$^1$ × Matrix_Adjacency$^1$

Matrix_Adjacency$^3$ =

Matrix_Adjacency$^2$ × Matrix_Adjacency$^1$

Matrix_Adjacency$^4$ =

Matrix_Adjacency$^3$ × Matrix_Adjacency$^1$

⋮

Matrix_Adjacency$^9$ = Matrix_Adjacency$^8$ × Matrix_Adjacency$^1$

Listing (1)

Thus, the right-hand multiplicand may always be the same Matrix_Adjacency$^1$. Since there may exist a computationally efficient Intersection method within the BitSet class for computing Boolean dot products between BitSets, the matrix multiplication may be transformed into a sequence of BitSet intersections by transposing the right-hand multiplicand (swapping rows and columns). This computation may be illustrated by the following equation Matrix_Adjacency$_{xy}^T$←Matrix_Adjacency$_{yx}^1$.

With this transposition of the adjacency matrix, the matrix multiplication may reduce to a sequence of Intersections. This sequence of intersections may be illustrated by the following equation Matrix_Adjacency$_{xy}^i$=Row$_x^{i-1}$ Intersect Row$_y^1$.

Identifying the groups (e.g., licensable units) may be accomplished by finding the set of unique rows in the matrix, where each such unique row may represent a group (e.g., licensable unit). One method of finding the unique rows may be to use a hash set (e.g., Java HashSet). Initially, the hash set may be empty. For each row in the matrix, the hash set may be consulted to see if it already contains a row like the one being considered. The likeness may be determined by the signature of the row (e.g., the positions of the 1's in the row). If the row is not already contained in the hash set, then that row may be added to the hash set. Once the rows of the matrix have been considered, the hash set may contain the set of unique rows. Each row in the hash set may represent a group (e.g., licensable unit). The products in that group may correspond to the 1's in that row. The unique rows may be illustrated in Table (4) below.

TABLE (4)

|    | PA | PB | PC | PD | PE | PF | PG | PH | PI |
|----|----|----|----|----|----|----|----|----|-----|
| PA | 1  | 1  | 0  | 1  | 0  | 0  | 1  | 0  | 1  |
| PC | 0  | 0  | 1  | 0  | 0  | 0  | 0  | 1  | 0  |
| PE | 0  | 0  | 0  | 0  | 1  | 1  | 0  | 0  | 0  |

Each unique row in Table (4) may represent a licensable unit. As illustrated in Table (4), there are three licensable units in this example. The first licensable unit includes Product A, Product B, Product D, Product G and Product I. The second licensable unit includes Product C and Product H. The third licensable unit includes Product E and Product F.

Another approach to finding the unique rows in the connectivity matrix may be to sort the matrix by making row exchanges (with their labels) and corresponding column exchanges (with their labels) such that leading 1's (the first 1 encountered in a traversal of a row) may be left-aligned. The resulting sorted connectivity matrix may then exhibit blocks of squares of 1's centered along the main diagonal. Each such block may correspond to a licensable unit. Table (5) provides an illustration of the resulting sorted connectivity matrix.

TABLE (5)

|    | PA | PB | PD | PG | PI | PC | PH | PE | PF |
|----|----|----|----|----|----|----|----|----|-----|
| PA | 1  | 1  | 1  | 1  | 1  | 0  | 0  | 0  | 0  |
| PB | 1  | 1  | 1  | 1  | 1  | 0  | 0  | 0  | 0  |
| PD | 1  | 1  | 1  | 1  | 1  | 0  | 0  | 0  | 0  |
| PG | 1  | 1  | 1  | 1  | 1  | 0  | 0  | 0  | 0  |
| PI | 1  | 1  | 1  | 1  | 1  | 0  | 0  | 0  | 0  |
| PC | 0  | 0  | 0  | 0  | 0  | 1  | 1  | 0  | 0  |
| PH | 0  | 0  | 0  | 0  | 0  | 1  | 1  | 0  | 0  |
| PE | 0  | 0  | 0  | 0  | 0  | 0  | 0  | 1  | 1  |
| PF | 0  | 0  | 0  | 0  | 0  | 0  | 0  | 1  | 1  |

The systems and methods disclosed may be applied to a broader class of problems which may involve many-to-many associations between finite resources or individuals, such as in social networking or anti-terrorism applications where it may be useful to determine groups of people associated by links such as e-mails, cellular phone calls, common flights, etc.

Other solutions for achieving the systems and methods disclosed herein have been considered. In one configuration, a database approach may be used to construct sets of related products. It should be noted that the database approach may be one configuration of the systems and methods disclosed herein. The database query approach may be reduced to the graph-based solution described herein and may be analogous to the matrix-based transformation of the graph-based solution.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a computing device 102 in which systems and methods for determining a group 124 based on a relationship 120 may be implemented. The computing device 102 may include a memory 104, a relating block/module 118, a grouping block/module 122, an operation block/module 130, an output device 134, and/or an input device 136. Examples of the computing device 102 include desktop computers, laptop computers, servers, supercomputers, tablet devices, cellular phones, smartphones, gaming systems and any other computing device. As used herein, a "block/module" may be implemented in hardware, software or a combination of both.

A memory 104 may be used to store data used by the computing device 102. The memory 104 may contain a product data 106, a license data 110 and/or a relationship data 116. In some configurations, the memory 104 may be coupled to any or every component of the computing device 102. Examples of the memory 104 include dynamic random access memory (DRAM), static random access memory (SRAM), flash memory, hard disks, floppy disks, magnetic tapes, optical disks, and any other data storage medium. The memory 104 may be volatile memory or non-volatile memory.

The product data 106 may identify one or more products. The product data 106 may include one or more product identifiers 108 for identifying a product. For ease of discussion, product may refer to a product or a product identifier 108. Examples of products include software, firmware and/or hardware, and/or any other finite resource, etc. For instance, a product may be a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). A product identifier 108 may be any information that may identify the product. In one instance, a product identifier 108 may be a string of characters containing at least a portion of a product's name. For example, a product identifier 108 may identify a software product as being Microsoft Office Professional 2010. In one configuration the product data 106 may also include additional data about a product. Product data 106 may include a set of one or more product identifiers 108. Product data 106 may be stored on the computing device 102 and/or received from some external source, such as a network, from the input device 136 (e.g., from a user) and/or from an external drive, etc.

The license data 110 may include data about one or more licenses 112. In some configurations license data 110 may include data about a set of licenses 112. A license 112 may govern the use of one or more products and may include one or more product designations 114 for designating the one or more products that the license 112 covers (i.e., governs). In one configuration, a product designation 114 may include a product identifier 108. For example, the license data 110 may include an OEM license 112 for covering a single product (e.g., Microsoft Office Professional 2010). In this example, the OEM license 112 covers a single product and may include a single product designation 114 (e.g., Microsoft Office Professional 2010). In another example, the license data 110 may include a volume license 112 with downgrade rights (e.g., Microsoft Office Enterprise 2010). In this example, the volume license 112 with downgrade rights may cover multiple products and therefore may include multiple product designations 114 (e.g., Microsoft Office Enterprise 2010, Microsoft Office Enterprise 2007). In one configuration, one or more licenses 112 may comprise a set of licenses 112. In another configuration, one or more product designations 114 may comprise a set of product designations 114. License data 110 may be stored on the computing device 102 and/or received from some external source, such as a network, from the input device 136 (e.g., from a user) and/or from an external drive, etc.

The relationship data 116 may include data about one or more relationships 120. A relationship 120 may be an association between one or more products and/or one or more licenses 112. In one configuration, a relationship 120 may be determined based on product identifiers 108 and product designations 114. The relationship data 116 and/or the relationship 120 may be determined by the relating block/module 118, accessed and/or stored in memory 104 (e.g., relationship 120b) and/or received from some external source, such as a network, from the input device 136 (e.g., from a user) and/or from an external drive, etc.

A relating block/module 118 may be used to identify one or more relationships 120a between a set of products and/or product identifiers 108 based on license data 110 (e.g., set of licenses 112). In one configuration, the overlapping product designations 114 from a set of licenses 112 may create one or more relationships 120a between a set of products and/or product identifiers 108 covered by different licenses 112. For example, a first license 112 covers a first product and a second product, and a second license 112 covers a second product and a third product. In this example, the relating block/module 118 may determine a relationship 120a between the first product and the second products, a relationship 120a between the second product and the third product and a relationship 120a between the first product and the third product. In this situation, the first product and the second product are related 120a as a result of the first license 112, the second product and the third product are related 120a as a result of the second license 112 and the first product and the third product are related 120a as a result of the overlapping product designation 114 of the second product by both the first license 112 and the second licenses 112.

A grouping block/module 122 may be used to form one or more distinct groups 124 of related products 126 and/or related licenses 128. Each related product 126 may have a relationship 120 with every other related product 126. The set of related products 126 may be a subset of the set of products and/or a subset of the set of product identifiers 108. Each related license 128 may have a relationship 120 with every other related license 128. The set of related licenses 128 may be a subset of the set of licenses 112. Groups 124 may be determined based on the relationships 120 determined by the relating block/module 118. The groups 124 may be determined (e.g., formed) for each set of related products 126 and/or related licenses 128. In one configuration, a first group 124 may include a first set of related licenses 128 and their corresponding set of related products 126, and a second group 124 may include a second set of related licenses 128 and their corresponding set of related products 126. For example, a first license 112 may cover a first product 108 and a second product 108 resulting in a relationship 120a between the first product 108 and the second product 108 and a relationship 120a between the first product 108 and the second product 108 and the first license 112. A second license 112 may cover a second product 108 and a third product 108 resulting in a relationship 120a between the second product 108 and the third product 108 and a relationship 120a between the second product 108 and the third product 108 and the second license 112. A third license 112 may cover a fourth product 108 resulting in a relationship 120a between the fourth product 108 and the third license 112. In this example, the overlap between the first license 112 and the second license 112 results in a relationship 120a between the first product 108 and the third product 108 and a relationship 120a between the first license 112 and the second license 112. In this situation, the first product 108, the second product 108 and the third product 108 are related products 126 and the first license 112 and the second license 112 are related licenses 128. In this example, the grouping block/module 122 may form two distinct groups 124. The grouping block/module 122 may form a first group 124 that includes the first product 108, the second product 108 and the third product 108, which are related products 126, and the first license 112 and the second license 112, which are related licenses 128. The grouping block/module 122 may form a second group 124 that includes the fourth product 108, a single related product 126, and the third license 112, a single related license 128. Thus, the grouping block/module 122 may form a set of distinct groups 124 based on related products 126 and/or related licenses 128.

An operation block/module 130 may be used for performing an operation based on one or more groups 124. Performing an operation may include outputting one or more groups 124 to an output device 134 and/or performing a calculation based on the one or more groups 124. In a product licensing scenario, each group 124 may be regarded as a "licensable unit" 124. A licensable unit 124 may be a group 124 of related products 126 and/or related licenses 128. For example, a volume license 112 for Microsoft Office Enterprise 2010 and a volume license 112 for Microsoft Office Enterprise 2007 may result in a licensing unit that includes several products including Microsoft Office Enterprise 2010, Microsoft Office Enterprise 2007 and Microsoft Office Enterprise 2003. As stated previously, the downgrade rights on Microsoft Office volume licenses 112 may mean that the license 112 for Microsoft Office Enterprise 2010 may cover both Microsoft Office Enterprise 2010 and Microsoft Office Enterprise 2007. Similarly, the license 112 for Microsoft Office Enterprise 2007 may cover both Microsoft Office Enterprise 2007 and Microsoft Office Enterprise 2003. In this example, the product Microsoft Office Enterprise 2007 may be covered by either license 112. Therefore, there is a relationship between the two Microsoft Office Enterprise licenses 112. Thus, the two Microsoft Office licenses 112 are related licenses 128. There is also a relationship 120 between each of the products. Each of the products may be covered by the two Microsoft Office licenses 112 in possibly multiple configurations. Therefore each of the products are related products 126. These related products 126 and related licenses 128 may constitute a licensable unit 124. In a situation where products may be licensed by multiple licenses 112 and licenses 112 may be applied to multiple products, a compliance calculation 132 for determining whether a given product is license compliant may require considering the compliance for each of the other related products 126 in the licensing unit 124. In this situation, grouping related products 126 and related licenses 128 as a licensing unit 124 may be necessary for proper compliance calculation 132. In another situation, one or more groups 124 may be outputted by an output device 134 to be stored and/or displayed for a user, etc.

The input device 136 may be used to receive input. Examples of input devices 136 include keyboards, mice, cameras, touchscreens, microphones, etc. For instance, a user may use an input device 136 to interact with the product data 106, the license data 110, the relationship data 116, and the function of the computing device 102. In one configuration, an input device 136 may be used to input the license data 110, which may then be used to derive the product data 106. In another configuration, program settings may be used to direct the function of the computing device 102. For example, the input device 136 may direct the operation block/module 130 to display the result of a compliance calculation 132.

The output device 134 may be used to output the results of the operation block/module 130. In one configuration, the operation block/module 130 may output the result of a compliance calculation 132. In another configuration, the operation block/module 130 may send one or more groups 124 to the output device 134 to be stored or displayed for a user.

It should be noted that one or more of the elements or components included in the computing device 102 may be implemented in hardware, software or a combination of both. Additionally or alternatively, the term "block/module" may be used to indicate that an element or component may be implemented in hardware, software or a combination of both.

Figure 2:
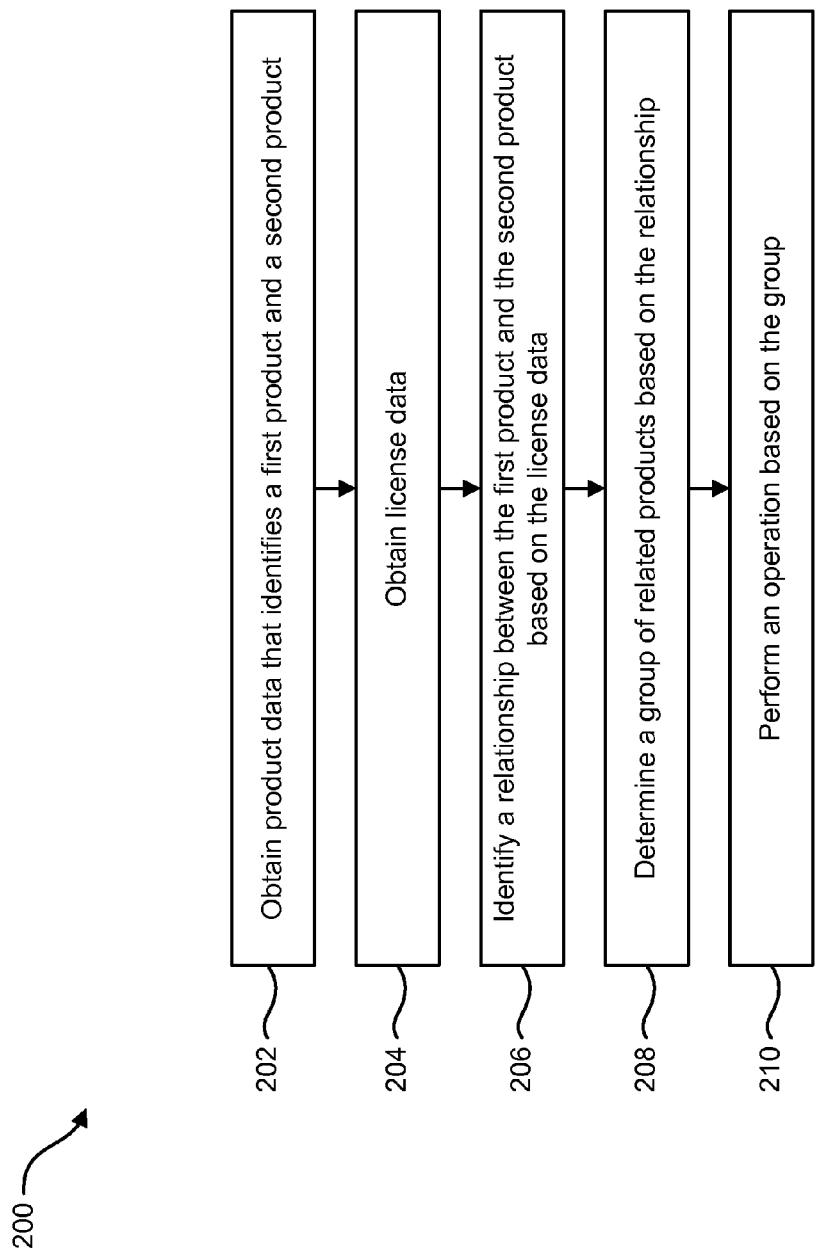
FIG. 2 is a flow diagram illustrating one configuration of a method for determining a group based on a relationship on a computing device.

FIG. 2 is a flow diagram illustrating one configuration of a method 200 for determining a group 124 based on a relationship 120 on a computing device 102. A computing device 102 may obtain 202 product data 106. For example, the computing device 102 may obtain 202 product data 106 from a file, user input, network communications, etc. For instance, a file containing product data 106 may be received from external media and stored in computing device 102 memory 104. Product data 106 may be additionally or alternatively obtained 202 over a network (e.g., Local Area Network (LAN), the Internet, etc.) of computing devices. In one configuration, product data 106 may be received from an inventory report of managed computing devices. Additionally or alternatively, the computing device 102 may receive user input including product data 106. The product data 106 may identify a first product and/or product identifier 108 and a second product and/or product identifier 108.

The computing device 102 may obtain 204 license data 110. For example, the computing device 102 may obtain 204 license data 110 from a file, user input, network communications, etc. For instance, a file may be received from external media and stored in computing device 102 memory 104. License data 110 may be additionally or alternatively obtained 204 over a network (e.g., Local Area Network (LAN), the Internet, etc.) of computing devices. In one configuration, license data 110 may be received from an inventory of licenses 112. Additionally or alternatively, the computing device 102 may receive user input including license data 110.

The computing device 102 may identify 206 a relationship 120 between the first product and/or product identifier 108 and the second product and/or product identifier 108 based on the license data 110. The computing device 102 may identify 206 both a direct relationship 120 and an indirect relationship 120. A direct relationship 120 may occur where a first product and a second product were both designated in the product designations 114 of a single license 112. An indirect relationship 120 may occur where a first product and a second product were both designated in the product designations 114 of one or more overlapping licenses 112. For example, a first license 112 may cover a first product and a second product and a second license 112 may cover a second product and a third product. In this example, there is a direct relationship 120 between the first product and the second product because they are both covered by the first license 112. Similarly, there is a direct relationship 120 between the second product and the third product because they are both covered by the second license 112. There is also an indirect relationship 120 between the first product and the third product due to the overlap between the first license 112 and the second license 112. In one configuration, relationships 120 are identified 206 among the set of all products and/or product identifiers 108 covered by a given set of licenses 112.

The computing device 102 may determine 208 a group 124 of related products 126 and/or related licenses 128 based on the identified 206 relationship 120. For example, the computing device 102 may determine 208 a group 124 for each set of related products 126 and/or related licenses 128. In one configuration, the computing device 102 determines 208 a group 124 for each set of related products 126 and/or related licenses 128. For instance, a first product and/or product identifier 108 and a second product and/or product identifier 108, which are related through a relationship 120, may be considered related products 126 and may be grouped into the same group 124. In another example, a first product and/or product identifier 108 covered by a first license 112 and a second product and/or product identifier 108 covered by a second license 112 may be considered related through a relationship 120. In this example, the first product and/or product identifier 108 and the second product and/or product identifier 108 may be related products 126 and the first license 112 and the second license 112 may be related licenses 128, with the related products 126 and the associated related licenses 128 being determined 208 to be a distinct group 124. Each group 124 may include the set of one or more related products 126 and/or their associated related licenses 128.

The computing device 102 may perform 210 an operation based on the one or more groups 124. For example, the computing device 102 may perform a compliance calculation 132. In the scenario where multi-product-covering licenses 112 are used, the compliance of related products 126 in a group 124 or licensable unit 124 may need to be considered in determining the compliance of the given product. In one configuration, the computing device 102 may automatically perform 210 a compliance calculation 132 for a given product and/or product identifier 108. In another configuration, the computing device 102 may receive a command from the input device 136 to perform a compliance calculation 132 for a given product and/or product identifier 108.

Additionally or alternatively, the computing device 102 may perform 210 other operations using the group data 124. For example, the group data 124 may be stored in a storage medium for future access. In another example, some or all of the group data 124 may be displayed to a user. In another example, some or all of the group data 124 may be transmitted elsewhere. For example, group data 124 may be transferred to another computing device 102, to a storage device, to a software program, etc.

Figure 3:
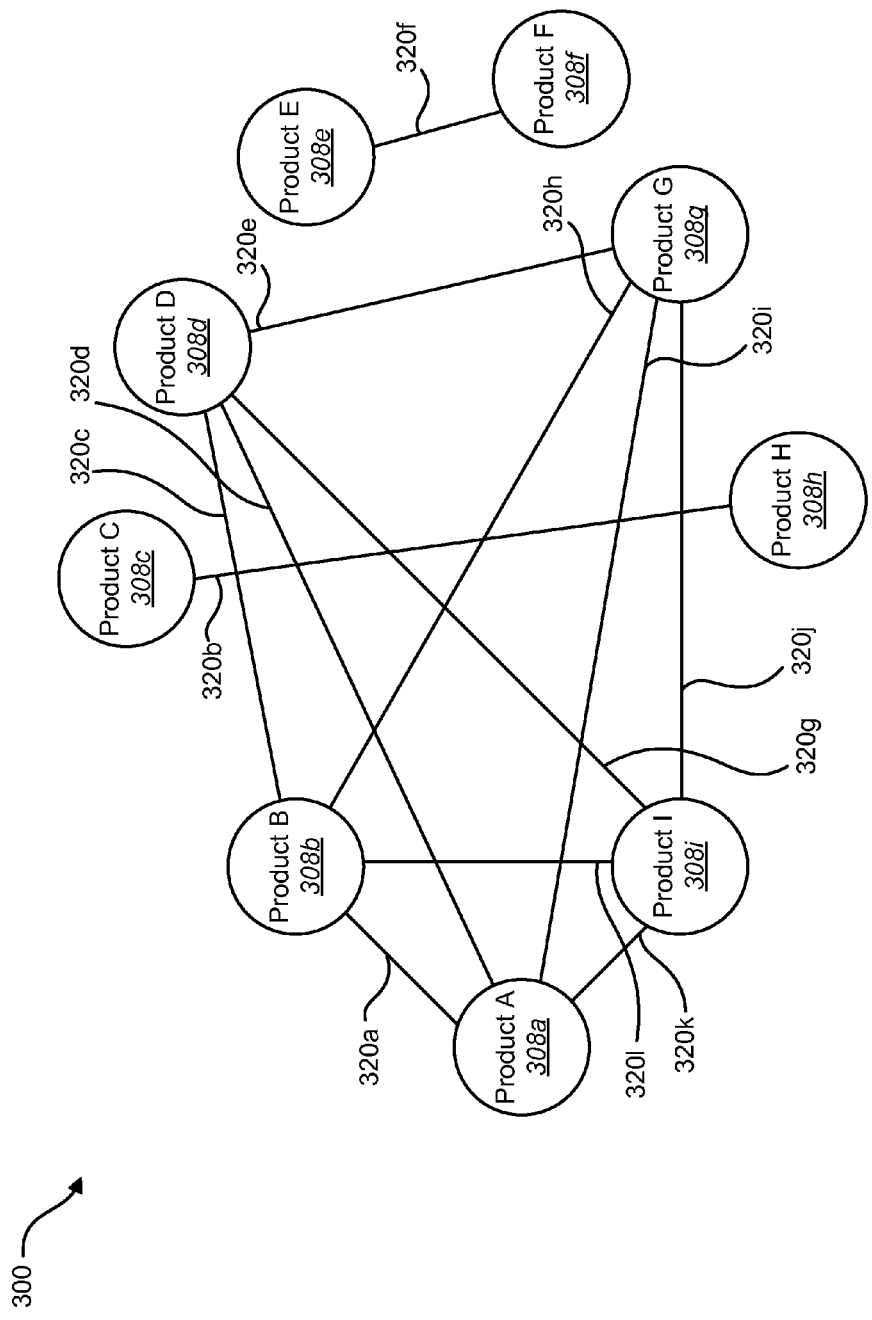
FIG. 3 is a diagram illustrating one example of data before determining a group based on a relationship.
Figure 4:
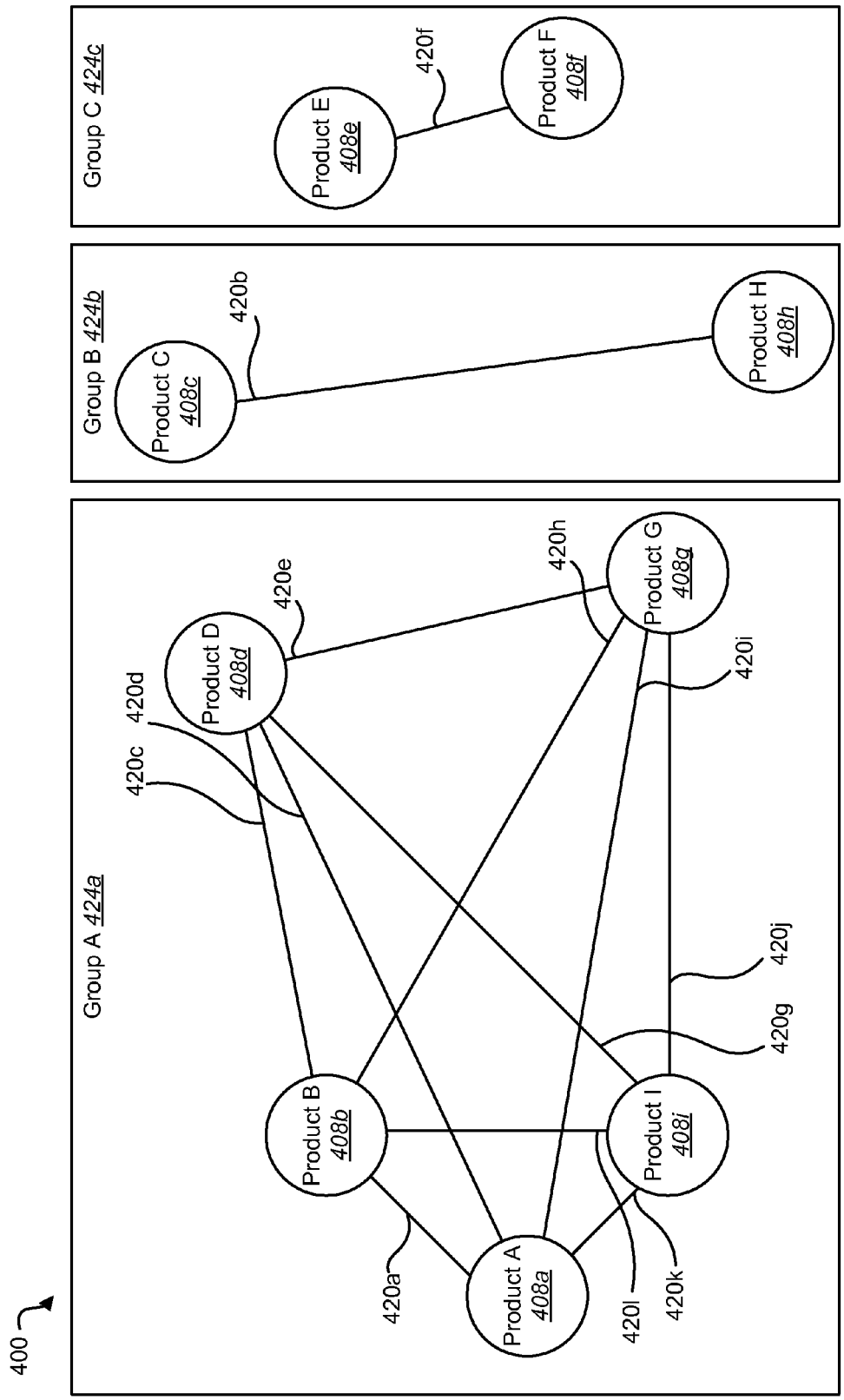
FIG. 4 is a diagram illustrating one example of data after determining a group based on a relationship.

A specific example of the systems and methods disclosed herein is illustrated in FIGS. 3 and 4. FIG. 3 is a diagram illustrating one example of data before determining a group based on a relationship 320. In one example of the systems and methods described herein, a graph 300 may be created wherein vertices correspond to products and/or product identifiers 308 and edges correspond to relationships 320 between products and/or product identifiers 308. For a given license, a relationship 320 may be found between one or more products and/or product identifiers 308 covered by the given license. Since a product may be covered by more than one license, a relationship 320 may be identified between a given product and/or product identifier 308 and the other products and/or product identifiers 308 to which the given product and/or product identifier 308 is related through the other licenses. Graph 300 illustrated in FIG. 3 includes several products and/or product identifiers 308a-i and relationships 320a-1. Graph 300 is based on the following licenses and their associated product designations expressed in the Table (6) below.

TABLE 6

| License A | Product A (308a) | Product B (308b) | |
|---|---|---|---|
| License B | Product A (308a) | | |
| License C | Product C (308c) | Product H (308h) | |
| License D | Product A (308a) | Product B (308b) | |
| License E | Product A (308a) | Product B (308b) | Product D (308d) |
| License F | Product E (308e) | | |
| License G | Product E (308e) | Product F (308f) | |
| License H | Product D (308d) | Product I (308i) | |
| License I | Product D (308d) | Product G (308g) | |

Relationships 320a-g may be found between each product and/or product identifier 308 covered by a given license. For example, License A may cover product identifier 308a and product identifier 308b. Therefore, there may be a direct license relationship 320a between product identifier 308a and product identifier 308b. License B may cover product identifier 308a. License C may cover product identifier 308c and product identifier 308h. Therefore there may be a direct license relationship 320b between product identifier 308c and product identifier 308h. License D may cover product identifier 308a and product identifier 308b. Therefore there may be a direct license relationship 320a between product identifier 308a and product identifier 308b. License E may cover product identifier 308a, product identifier 308b, and product identifier 308d. Therefore there may be a direct license relationship 320a between product identifier 308a and product identifier 308b, a direct license relationship 320c between product identifier 308b and product identifier 308d, and a direct license relationship 320d between product identifier 308a and product identifier 308d. License F may cover product identifier 308e. License G may cover product identifier 308e and product identifier 308f. Therefore there may be a direct license relationship 320f between product identifier 308e and product identifier 308f. License H may cover product identifier 308d and product identifier 308i. Therefore there may be a direct license relationship 320g between product identifier 308d and product identifier 308i. License I may cover product identifier 308d and product identifier 308g. Therefore there may be a direct license relationship 320e between product identifier 308d and product identifier 308g.

Relationships 320h-l may be found between products and/or product identifiers 308 as a result of one or more overlapping licenses. For example, the overlap of License E and License I may result in a relationship 320h between product identifier 308b and product identifier 308g. The overlap of License E and License I may result in a relationship 320i between product identifier 308a and product identifier 308g. The overlap of License H and License I may result in a relationship 320j between product identifier 308i and product identifier 308g. The overlap of License E and License H may result in a relationship 320k between product identifier 308a and product identifier 308i. The overlap of License E and License H may result in a relationship 320l between product identifier 308b and product identifier 308i.

The resulting graph 300 of products and/or product identifiers 308a-i and relationships 320a-1 may illustrate the set of all relationships 320a-1 between the set of all products and/or product identifiers 308a-i. In one configuration, only a portion of the set of all products and/or product identifiers 308 may be considered. In another configuration, only a portion of the set of all relationships 320 may be considered.

The products and/or product identifiers 308 and relationships 320 may be grouped based on one or more relationships 320 between the products and/or product identifiers 308. In this example, graph 300 may have multiple components. Each component may be a maximally connected subgraph where, through a finite sequence of relationship 320 traversals, each product and/or product identifier 308 may reach any other product and/or product identifier 308. This determination of subgraphs effectively partitions the products and/or product identifiers 308 and relationships 320 into distinct groups.

FIG. 4 is a diagram illustrating one example of data after determining a group 424 based on a relationship 420. FIG. 4 may be a continuation of the example illustrated in FIG. 3. For example, the illustration in FIG. 4 may be the result of determining groups of related products from the products of FIG. 3. Membership in each group 424 may be based on relationships 420. Therefore, identifying relationships 420 to create a maximally connected subgraph may effectively partition the products and/or product identifiers 408 and their associated licenses into distinct groups 424. For instance, in a group 424, every product and/or product identifier 408 may be able to reach any other product and/or product identifier 408 in the group 424 through a finite sequence of relationship 420 traversals. It should be noted that there may not be any relationships 420 between products and/or product identifiers 408 in different groups 424.

The determination of maximally connected subgraphs effectively partitions the products and/or product identifiers 408 and relationships 420 into distinct groups 424a-c. Groups 424a-c are each maximally connected subgraphs, where through a finite number of relationship 420 traversals, each product and/or product identifier 408 may reach any other product and/or product identifier 408 in the group 424.

Group A 424a may be a maximally connected subgraph comprised of products and/or product identifiers 408a-b, 408d, 408g, and 408i, and relationships 420a, 420c-e, 420g-1. Group B 424b may be a maximally connected subgraph comprised of products and/or product identifiers 408c and 408h and relationship 420b. Group C 424c may be a maximally connected subgraph comprised of products and/or product identifiers 408e and 408f and relationship 420f. It may be noted that identifying a group 424 based on relationships 420 may not be apparent. For example, in graph 300 of FIG. 3, it may not have been apparent that products and/or product identifiers 308c and 308h were not related 320 to products and/or product identifiers 308a, 308b, 308d, 308g, and 308i. Forming a maximally connected subgraph effectively partitions the products and/or product identifiers 408 and/or licenses based on relationships 420.

It may be noted that there may be no relationship 420 between any of the products and/or product identifiers 408 of one group 424 and any of the products and/or product identifiers 408 of another group 424.

Figure 5:
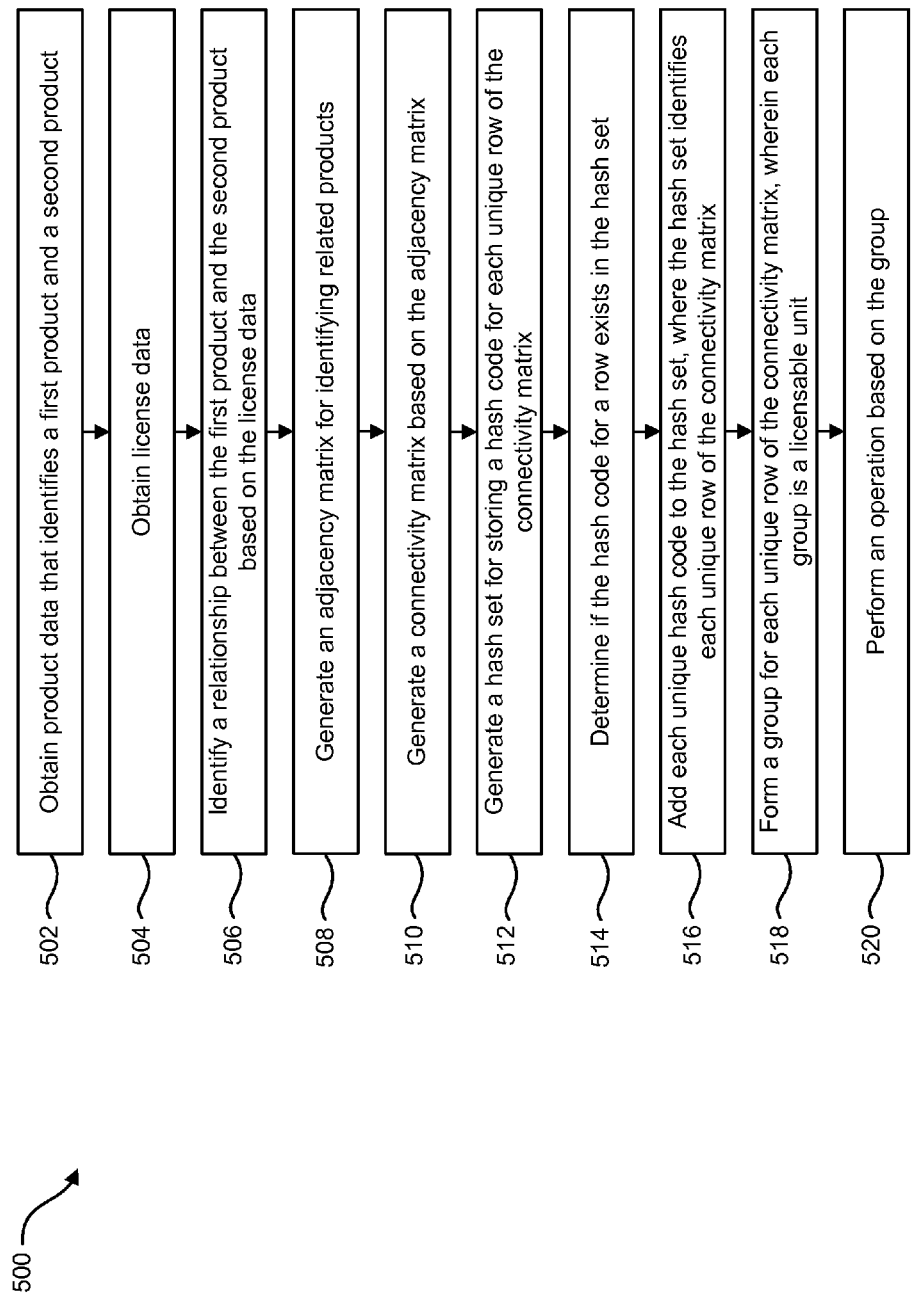
FIG. 5 is a flow diagram illustrating a more specific configuration of a method for determining a group based on a relationship on a computing device.

FIG. 5 is a flow diagram illustrating a more specific configuration of a method 500 for determining a group 124 based on a relationship 120 on a computing device 102. A computing device 102 may obtain 502 product data 106. For example, the computing device 102 may obtain 502 product data 106 from a file, user input, network communications, etc. For instance, a file containing product data 106 may be received from external media and stored in computing device 102 memory 104. Product data 106 may be additionally or alternatively obtained 502 over a network (e.g., Local Area Network (LAN), the Internet, etc.) of computing devices. In one configuration, product data 106 may be received from an inventory report of managed computing devices. Additionally or alternatively, the computing device 102 may receive user input including product data 106. The product data 106 may identify a first product and/or product identifier 108 and a second product and/or product identifier 108.

The computing device 102 may obtain 504 license data 110. For example, the computing device 102 may obtain 504 license data 110 from a file, user input, network communications, etc. For instance, a file may be received from external media and stored in computing device 102 memory 104. License data 110 may be additionally or alternatively obtained 504 over a network (e.g., Local Area Network (LAN), the Internet, etc.) of computing devices. In one configuration, license data 110 may be received from an inventory of licenses 112. Additionally or alternatively, the computing device 102 may receive user input including license data 110.

The computing device 102 may identify 506 a relationship 120 between the first product and/or product identifier 108 and the second product and/or product identifier 108 based on the license data 110. The computing device 102 may identify 506 both a direct relationship 120 and an indirect relationship 120. A direct relationship 120 may occur where a first product and a second product were both designated in the product designations 114 of a single license 112. An indirect relationship 120 may occur where a first product and a second product were both designated in the product designations 114 of one or more overlapping licenses 112. For example, a first license 112 may cover a first product and a second product and a second license 112 may cover a second product and a third product. In this example, there is a direct relationship 120 between the first product and the second product because they are both covered by the first license 112. Similarly, there is a direct relationship 120 between the second product and the third product because they are both covered by the second license 112. There is also an indirect relationship 120 between the first product and the third product due to the overlap between the first license 112 and the second license 112. In one configuration, relationships 120 are identified 506 among the set of all products and/or product identifiers 108 covered by a given set of licenses 112.

The computing device 102 may generate 508 an adjacency matrix for identifying related products and/or product identifiers 108. An adjacency matrix may indicate direct relationships 120 between products and/or product identifiers 108 due to individual licenses 112. In one configuration, an adjacency matrix may be formed by creating a square relationship matrix. A row and a corresponding column may be formed for each product and/or product identifier 108. A '1' (or "True") may mark the intersection of a row corresponding to one product and/or product identifier 108 with the column corresponding to another license-related product and/or product identifier 108, and a '0' (or "False") may mark the absence of a direct relationship 120 between corresponding products and/or product identifiers 108. In this scenario, single-product licenses may be represented along the main diagonal of the adjacency matrix, with 1's at the intersection of the row and the column corresponding to the given product and/or product identifier 108.

The computing device 102 may generate 510 a connectivity matrix based on the adjacency matrix. In one configuration, a connectivity matrix may be computed from an adjacency matrix by taking the sum of all powers i of the adjacency matrix (for i ranging from 1 to N, where N is the number of products and/or product identifiers 108 in the adjacency matrix). This equation may be represented as Matrix_Connectivity=$\Sigma$Matrix_Adjacency$^i$. This may be equivalent to the transitive closure of the adjacency matrix. The math for matrix multiplication (used for computing powers of matrices) and for matrix addition (used for summing the power matrices) can be simplified by considering that only truth is needed. Consequently, the operation of matrix multiplication may need only produce a '1' ("True") or '0' ("False") rather than an arithmetic sum of the products for each position in the matrix. Similarly, operation of matrix addition may need only to produce a '1' ("True") or '0' ("False") (effectively a Boolean OR operation) rather than an arithmetic sum of the values at each position in the matrix. It should be noted that connectivity matrix computations may be improved through bitwise intersection functionality provided by existing and commercially available software libraries (e.g., Java BitSet class).

The computing device 102 may generate 512 a hash set for storing a hash code for each unique row of the connectivity matrix. An example of a hash set may include an array, linked list, hash table, heap, tree, table and/or any suitable data structure, etc. In one configuration, a hash set may be predefined in software (e.g., Java HashSet). A hash set may be initially empty and of sufficient size to store a hash value for each unique row of the connectivity matrix.

The computing device 102 may determine 514 if the hash code for a row exists in the hash set. In one configuration, the hash code may be the string of 1's and 0's for each row of the connectivity matrix, where the products and/or product identifiers 108 correspond to the 1's in the row. Determining 514 if the hash code for a row exists in the hash set may be a compare function between a row of the connectivity matrix and each of the values in the hash set.

The computing device 102 may add 516 each unique hash code to the hash set. In one configuration, the hash set identifies each unique row of the connectivity matrix. For example, following the determination that a hash code does not exist in the hash set, the hash code is added as an additional member of the hash set.

The computing device 102 may determine and/or form 518 a group 124 for each unique row of the connectivity matrix. In one configuration, the computing device 102 may form a distinct group for each unique row of the connectivity matrix. In one instance, the effect of the connectivity matrix is that each unique row of the connectivity matrix may determine an entire set of related products 126 and/or related licenses. In one configuration, each unique row of the connectivity matrix may be a group 124 or licensable unit 124. Each group 124 may include the set of one or more related products 126 and/or related licenses 128.

The computing device 102 may perform 520 an operation based on the one or more groups 124. For example, the computing device 102 may perform 520 a compliance calculation 132. In the scenario where multi-product-covering licenses 112 are used, the compliance of related products 126 in a group 124 or licensable unit 124 may need to be considered in determining the compliance of the given product. In one configuration, the computing device 102 may automatically perform 520 a compliance calculation 132 for a given product and/or product identifier 108. In another configuration, the computing device 102 may receive a command from the input device 136 to perform a compliance calculation 132 for a given product and/or product identifier 108.

Additionally or alternatively, the computing device 102 may perform 520 other operations using the group data 124. For example, the group data 124 may be stored in a storage medium for future access. In another example, some or all of the group data 124 may be displayed to a user. In another example, some or all of the group data 124 may be transmitted elsewhere. For example, group data 124 may be transferred to another computing device 102, to a storage device, to a software program, etc.

Figure 6:
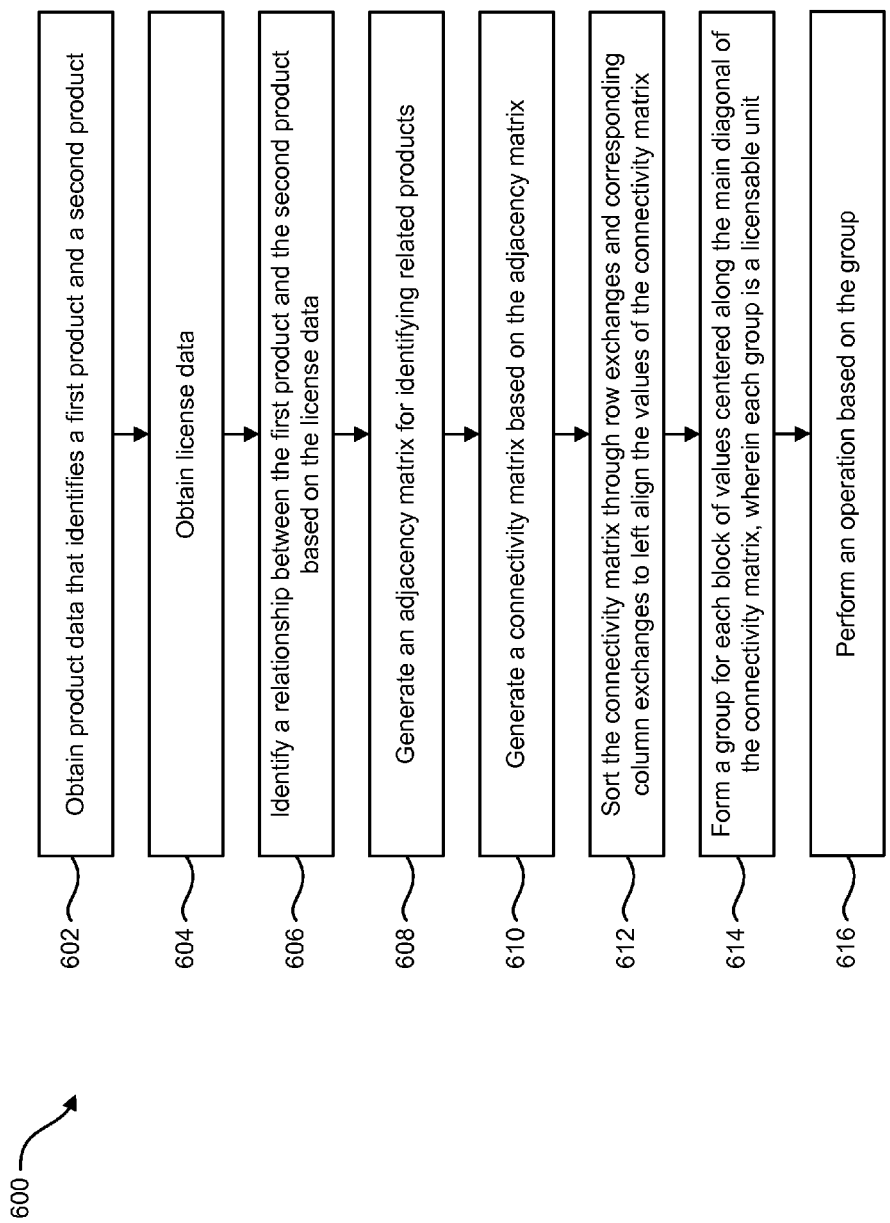
FIG. 6 is a flow diagram illustrating another more specific configuration of a method for determining a group based on a relationship on a computing device.

FIG. 6 is a flow diagram illustrating another more specific configuration of a method 600 for determining a group 124 based on a relationship 120 on a computing device 102. A computing device 102 may obtain 602 product data 106. For example, the computing device 102 may obtain 602 product data 106 from a file, user input, network communications, etc. For instance, a file containing project data 106 may be received from external media and stored in computing device 102 memory 104. Product data 106 may be additionally or alternatively obtained 602 over a network (e.g., Local Area Network (LAN), the Internet, etc.) of computing devices. In one configuration, product data 106 may be received from an inventory report of managed computing devices. Additionally or alternatively, the computing device 102 may receive user input including product data 106. The product data 106 may identify a first product and/or product identifier 108 and a second product and/or product identifier 108.

The computing device 102 may obtain 604 license data 110. For example, the computing device 102 may obtain 604 license data 110 from a file, user input, network communications, etc. For instance, a file may be received from external media and stored in computing device 102 memory 104. License data 110 may be additionally or alternatively obtained 604 over a network (e.g., Local Area Network (LAN), the Internet, etc.) of computing devices. In one configuration, license data 110 may be received from an inventory of licenses 112. Additionally or alternatively, the computing device 102 may receive user input including license data 110.

The computing device 102 may identify 606 a relationship 120 between the first product and/or product identifier 108 and the second product and/or product identifier 108 based on the license data 110. The computing device 102 may identify 606 both a direct relationship 120 and an indirect relationship 120. A direct relationship 120 may occur where a first product 108 and a second product 108 were both designated in the product designations 114 of a single license 112. An indirect relationship 120 may occur where a first product 108 and a second product 108 were both designated in the product designations 114 of one or more overlapping licenses 112. For example, a first license 112 may cover a first product 108 and a second product 108 and a second license 112 may cover a second product 108 and a third product 108. In this example, there is a direct relationship 120 between the first product 108 and the second product 108 because they are both covered by the first license 112. Similarly, there is a direct relationship 120 between the second product 108 and the third product 108 because they are both covered by the second license 112. There is also an indirect relationship 120 between the first product 108 and the third product 108 due to the overlap between the first license 112 and the second license 112. In one configuration, relationships 120 are identified 606 among the set of all products and/or product identifiers 108 covered by a given set of licenses 112.

The computing device 102 may generate 608 an adjacency matrix for identifying related products and/or product identifiers 108. An adjacency matrix may indicate direct relationships 120 between products and/or product identifiers 108 due to individual licenses 112. In one configuration, an adjacency matrix may be formed by creating a square relationship matrix. A row and a corresponding column may be formed for each product and/or product identifier 108. A '1' (or "True") may mark the intersection of a row corresponding to one product and/or product identifier 108 with the column corresponding to another license-related product and/or product identifier 108, and a '0' (or "False") may mark the absence of a direct relationship 120 between corresponding products and/or product identifiers 108. In this scenario, single-product licenses may be represented along the main diagonal of the adjacency matrix, with 1's at the intersection of the row and the column corresponding to the given product and/or product identifier 108.

The computing device 102 may generate 610 a connectivity matrix based on the adjacency matrix. In one configuration, a connectivity matrix may be computed from an adjacency matrix by taking the sum of all powers i of the adjacency matrix (for i ranging from 1 to N, where N is the number of products and/or product identifiers 108 in the adjacency matrix). This equation may be represented as $Matrix\_Connectivity = \Sigma Matrix\_Adjacency^i$. This may be equivalent to the transitive closure of the adjacency matrix. The math for matrix multiplication (used for computing powers of matrices) and for matrix addition (used for summing the power matrices) can be simplified by considering that only truth is needed. Consequently, the operation of matrix multiplication may need only produce a '1' ("True") or '0' ("False") rather than an arithmetic sum of the products for each position in the matrix. Similarly, operation of matrix addition may need only to produce a '1' ("True") or '0' ("False") (effectively a Boolean OR operation) rather than an arithmetic sum of the values at each position in the matrix. It should be noted that one optimization of the computation of the connectivity matrix leverages bitwise intersection functionality provided by existing and commercially available software libraries (e.g., Java BitSet class).

The computing device 102 may sort 612 the connectivity matrix through row exchanges and corresponding column exchanges to left align values of the connectivity matrix. For example, row exchanges (with their labels) may be made along with corresponding column exchanges (with their labels) such that the leading 1's (the first 1 encountered in traversal of a row) may be left aligned. In one configuration, the row exchanges and corresponding column exchanges may result in the sorted connectivity matrix exhibiting blocks of squares of 1's centered along the main diagonal. In the example set forth in the detailed description of FIGS. 3 and 4, the row exchanges and corresponding column exchanges may result in a sorted connectivity matrix with the following row and corresponding column ordering: Product A, Product B, Product D, Product G, Product I, Product C, Product H, Product E, and Product F. In this example, a traversal from the left may reveal that the first block of ones encompasses the row and column intersections of Product A, Product B, Product D, Product G, and Product I, the second block of squares encompasses the row and column intersections of Product C and Product H, and the third block of squares encompasses the row and column intersection of Product E and Product F. It is noted that these blocks of values centered along the main diagonal of the sorted connectivity matrix correspond with the groupings 424 in FIG. 4.

The computing device 102 may determine and/or form 614 a group 124 for each block of values centered along the main diagonal of the connectivity matrix. In one configuration, the computing device 102 may form a distinct group for each block of values centered along the main diagonal of the connectivity matrix. Each block of values centered along the main diagonal of the sorted connectivity matrix may be a group 124 or licensable unit 124. In some configurations, each group 124 may include the set of one or more related products 126 and/or related licenses 128.

Additionally or alternatively, the computing device 102 may determine and/or form 614 a group 124 for each unique row of the of the connectivity matrix. In one configuration, the computing device 102 may form a distinct group for each unique row of the connectivity matrix. In another configuration, each unique row of the connectivity matrix may be a group 124 or licensable unit 124. Each group 124 may include the set of one or more related products 126 and/or related licenses 128.

The computing device 102 may perform 616 an operation based on the one or more groups 124. For example, the computing device 102 may perform a compliance calculation 132. In the scenario where multi-product-covering licenses 112 are used, the compliance of related products 126 in a group 124 or licensable unit 124 may need to be considered in determining the compliance of the given product. In one configuration, the computing device 102 may automatically perform 616 a compliance calculation 132 for a given product and/or product identifier 108. In another configuration, the computing device 102 may receive a command from the input device 136 to perform 616 a compliance calculation 132 for a given product and/or product identifier 108.

Additionally or alternatively, the computing device 102 may perform 616 other operations using the group data 124. For example, the group data 124 may be stored in a storage medium for future access. In another example, some or all of the group data 124 may be displayed to a user. In another example, some or all of the group data 124 may be transmitted elsewhere. For example, group data 124 may be transferred to another computing device 102, to a storage device, to a software program, etc.

Figure 7:
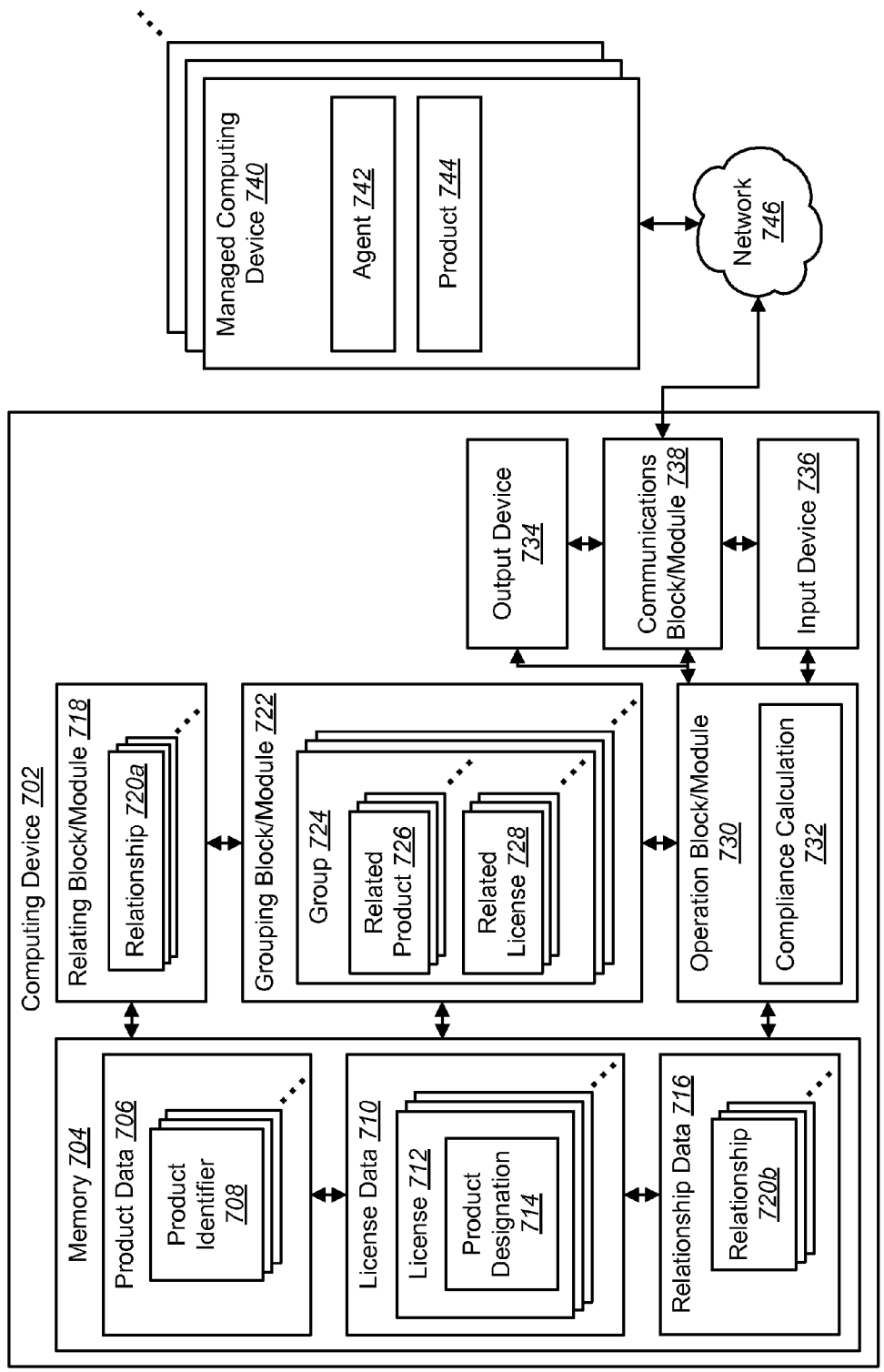
FIG. 7 is a block diagram illustrating another configuration of a computing device in which systems and methods for determining a group based on a relationship may be implemented.

FIG. 7 is a block diagram illustrating another configuration of a computing device 702 in which systems and methods for determining a group 724 based on a relationship 720 may be implemented. The computing device 702 may include a memory 704, a relating block/module 718, a grouping block/module 722, an operation block/module 730, an output device 734, and/or an input device 736. Examples of the computing device 702 include desktop computers, laptop computers, servers, supercomputers, tablet devices, cellular phones, smartphones, gaming systems and any other computing device. As used herein, a "block/module" may be implemented in hardware, software or a combination of both.

A memory 704 may be used to store data used by the computing device 702. The memory 704 may include product data 706, license data 710 and/or relationship data 716. In some configurations, the memory 704 may be coupled to any or every component of the computing device 702. Examples of the memory 704 include dynamic random access memory (DRAM), static random access memory (SRAM), flash memory, hard disks, floppy disks, magnetic tapes, optical disks, and any other data storage medium. The memory 704 may be volatile memory or non-volatile memory.

The product data 706 may identify one or more products. The product data 706 may include one or more product identifiers 708 for identifying a product. For ease of discussion, product may refer to a product or a product identifier 708. Examples of products include software, firmware and/or hardware, and/or any other finite resource, etc. For instance, a product may be a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). A product identifier 708 may be any information that may identify the product. In one instance, a product identifier 708 may be a string of characters containing at least a portion of a product's name. For example, a product identifier 708 may identify a software product as being Microsoft Office Professional 2010. In one configuration, the product data 706 may also include additional data about a product. Product data 706 may include a set of one or more product identifiers 708. Product data 706 may be stored on the computing device 702 and/or received from some external source, such as a network, from the input device 736 (e.g., from a user) and/or from an external drive, etc.

The license data 710 may include data about one or more licenses 712. In some configurations, the license data 710 may include data about a set of licenses 712. A license 712 may govern the use of one or more products and may include one or more product designations 714 for designating the one or more products that the license 712 covers (i.e., governs). In one configuration, a product designation 714 may include a product identifier 708. For example, the license data 710 may include an OEM license 712 for covering a single product (e.g., Microsoft Office Professional 2010). In this example, the OEM license 712 covers a single product and may include a single product designation 714 (e.g., Microsoft Office Professional 2010). In another example, the license data 710 may include a volume license 712 with downgrade rights (e.g., Microsoft Office Enterprise 2010). In this example, the volume license 712 with downgrade rights may cover multiple products and therefore may include multiple product designations 714 (e.g., Microsoft Office Enterprise 2010, Microsoft Office Enterprise 2007). In one configuration, one or more licenses 712 may comprise a set of licenses 712. In another configuration, one or more product designations 714 may comprise a set of product designations 714. License data 710 may be stored on the computing device 702 and/or received from some external source, such as a network, from the input device 736 (e.g., from a user) and/or from an external drive, etc.

The relationship data 716 may include data about one or more relationships 720. A relationship 720 may be an association between one or more products and/or one or more licenses 712. In one configuration, a relationship 720 may be determined based on product identifiers 708 and product designations 714. The relationship data 716 and/or the relationship 720 may be determined by the relating block/module 718, accessed and/or stored in memory 704 (e.g., relationship 720b) and/or received from some external source, such as a network, from the input device 736 (e.g., from a user) and/or from an external drive, etc.

A relating block/module 718 may be used to identify one or more relationships 720a between a set of products and/or product identifiers 708 based on license data 710 (e.g., set of licenses 712). In one configuration, the overlapping product designations 714 from a set of licenses 712 may create one or more relationships 720a between a set of products and/or product identifiers 708 covered by different licenses 712. For example, a first license 712 covers a first product 708 and a second product 708, and a second license 712 covers a second product 708 and a third product 708. In this example, the relating block/module 718 may determine a relationship 720a between the first product 708 and the second product 708, a relationship 720a between the second product 708 and the third product 708 and a relationship 720a between the first product 708 and the third product 708. In this situation, the first product 708 and the second product 708 are related 720a as a result of the first license 712, the second product 708 and the third product 708 are related 720a as a result of the second license 712 and the first product 708 and the third product 708 are related 720a as a result of the overlapping product designation 714 of the second product 708 by both the first license 712 and the second licenses 712.

A grouping block/module 722 may be used to form one or more distinct groups 724 of related products 726 and/or related licenses 728. Each related product 726 may have a relationship 720 with every other related product 726. The set of related products 726 may be a subset of the set of products 708 and/or a subset of the set of product identifiers 708. Each related license 728 may have a relationship 720 with every other related license 728. The set of related licenses 728 may be a subset of the set of licenses 712. Groups 724 may be determined based on the relationships 720 determined by the relating block/module 718. The groups 724 may be determined (e.g., formed) for each set of related products 726 and/or related licenses 728. In one configuration, a first group 724 may include a first set of related licenses 728 and their corresponding set of related products 726, and a second group 724 may include a second set of related licenses 728 and their corresponding set of related products 726. For example, a first license 712 may cover a first product 708 and a second product 708 resulting in a relationship 720a between the first product 708 and the second product 708 and a relationship 720a between the first product 708 and the second product 708 and the first license 712. A second license 712 may cover a second product 708 and a third product 708 resulting in a relationship 720a between the second product 708 and the third product 708 and a relationship 720a between the second product 708 and the third product 708 and the second license 712. A third license 712 may cover a fourth product 708 resulting in a relationship 720a between the fourth product 708 and the third license 712. In this example, the overlap between the first license 712 and the second license 712 results in a relationship 720a between the first product 708 and the third product 708 and a relationship 720a between the first license 712 and the second license 712. In this situation, the first product 708, the second product 708 and the third product 708 are related products 726 and the first license 712 and the second license 712 are related licenses 728. In this example, the grouping block/module 722 may form two distinct groups 724. The grouping block/module 722 may form a first group 724 that includes the first product 708, the second product 708 and the third product 708, which are related products 726, and the first license 712 and the second license 712, which are related licenses 728. The grouping block/module 722 may for a second group 724 that includes the fourth product 708, a single related product 726, and the third license 712, a single related license 728. Thus, the grouping block/module 722 may form a set of distinct groups 724 based on related products 726 and/or related licenses 728.

An operation block/module 730 may be used for performing an operation based on one or more groups 724. Performing an operation may include outputting one or more groups 724 to an output device 734 and/or performing a calculation based on the one or more groups 724. In a product licensing scenario, each group 724 may be regarded as a "licensable unit" 724. A licensable unit 724 may be a group 724 of related products 726 and/or related licenses 728. For example, a volume license 712 for Microsoft Office Enterprise 2010 and a volume license 712 for Microsoft Office Enterprise 2007 may result in a licensing unit that includes several products including Microsoft Office Enterprise 2010, Microsoft Office Enterprise 2007 and Microsoft Office Enterprise 2003. As stated previously, the downgrade rights on Microsoft Office volume licenses 712 may mean that the license 712 for Microsoft Office Enterprise 2010 may cover both Microsoft Office Enterprise 2010 and Microsoft Office Enterprise 2007. Similarly, the license 712 for Microsoft Office Enterprise 2007 may cover both Microsoft Office Enterprise 2007 and Microsoft Office Enterprise 2003. In this example, the product Microsoft Office Enterprise 2007 may be covered by either license 712. Therefore, there is a relationship between the two Microsoft Office Enterprise licenses 712. Thus, the two Microsoft Office licenses 712 are related licenses 728. There is also a relationship 720 between each of the products. Each of the products may be covered by the two Microsoft Office licenses 712 in possibly multiple configurations. Therefore each of the products are related products 726. These related products 726 and related licenses 728 may constitute a licensable unit 724. In a situation where products may be licensed by multiple licenses 712 and licenses 712 may be applied to multiple products, a compliance calculation 732 for determining whether a given product is license compliant may require considering the compliance for each of the other related products 726 in the licensing unit 724. In this situation, grouping related products 726 and related licenses 728 as a licensing unit 724 may be necessary for proper compliance calculation 732. In another situation, one or more groups 724 may be outputted by an output device 734 to be stored and/or displayed for a user, etc.

The input device 736 may be used to receive input. Examples of input devices 736 include keyboards, mice, cameras, touchscreens, microphones, etc. For instance, a user may use an input device 736 to interact with the product data 706, the license data 710, the relationship data 716, and the function of the computing device 702. In one configuration, an input device 736 may be used to input the license data 710, which may then be used to derive the product data 706. In another configuration, program settings may be used to direct the function of the computing device 702. For example, the input device 736 may direct the operation block/module 730 to display the result of a compliance calculation 732.

The output device 734 may be used to output the results of the operation block/module 730. In one configuration, the operation block/module 730 may output the result of a compliance calculation 732. In another configuration, the operation block/module 730 may send one or more groups 724 to the output device 734 to be stored or displayed for a user.

It should be noted that one or more of the elements or components included in the computing device 702 may be implemented in hardware, software or a combination of both. Additionally or alternatively, the term "block/module" may be used to indicate that an element or component may be implemented in hardware, software or a combination of both.

The computing device 702 may communicate with one or more managed computing devices 740. For example, the computing device 702 may be used to manage one or more managed computing devices 740. The managed computing devices 740 may be other computing devices such as desktop computers, laptop computers, tablet devices, smartphones, cellular phones, gaming consoles, etc. In one configuration, the computing device 702 may send messages to one or more managed computing devices 740 instructing the managed computing device(s) 740 to perform operations. For instance, a computing device 702 may instruct one or more managed computing devices 740 to install software, uninstall software, shut down, reboot, install a patch or update for a product 744, block access to one or more products 744 on the managed computing devices 740, allow access to one or more products 744 on the managed computing devices 740, fix or remove security threats (e.g., viruses, Trojans, worms, spyware, malware, adware, etc.), provide an inventory, etc.

Communications between the computing device 702 and the one or more managed computing devices 740 may occur using a network 746. Examples of the network 746 include Local Area Networks (LANs), the Internet, Wide Area Networks (WANs), etc.

The one or more managed computing devices 740 may each include an agent 742 and one or more products 744. Examples of products 744 include software, firmware and/or hardware included on the managed computing device 740. For instance, a product 744 may be a program (e.g., Microsoft Word, Excel, PowerPoint, Access, Internet Explorer, Windows Media Player, Windows, Apple iTunes, OS X, etc.), firmware and/or hardware (e.g., sound card, video card, display, network card, printer, projector, processor, memory (e.g., Random Access Memory (RAM), hard drive storage, etc.), removable memory/storage, etc.). The agent 742 may be software and/or hardware that is used to manage and/or perform operations on the managed computing device 740. For example, the agent 742 may receive and perform instructions from the computing device 702. For instance, the agent 742 may uninstall software, eliminate threats (e.g., viruses, Trojans, worms, malware, adware, spyware, etc.), report information to the computing device 702 (e.g., usage reports, status, etc.), update firmware, detect unauthorized use, detect unauthorized products 744 on the managed computing device 740, etc. This may be done according to instructions received from the computing device 702, for example.

The computing device 702 may use the communications block/module 738 to communicate with one or more managed computing devices 740 using a network 746. For example, the communications block/module 738 may format and/or send messages to the one or more managed computing devices 740 using the network 746. Additionally or alternatively, the communications block/module 738 may receive messages from the one or more managed computing devices 740, which it 738 may provide to the operation block/module 730.

In one configuration, the computing device 702 may perform one or more operations based on communications with the one or more managed computing devices 740. For example, the computing device 702 may receive information from a managed computing device 740 indicating that a new product 744 has been installed. The communications block/module 738 may receive this message and may provide it to the operation block/module 730, which may perform a compliance calculation 732 for the new product 744. The compliance calculation 732 may take into consideration the compliance for each of the other products 744 and/or product identifiers 708 that are in the same group 724 (e.g., related products 726) to the new product 744. Additionally or alternatively, the operation block/module 730 may add the one or more products 744 and/or product identifiers 708 to the product data 706. In one configuration, a license 712 that covers the new product 744 may be added to the license data 710. The operation block/module 730 may also send a message to the relating block/module 718 to identify relationships 720 between the new product 744 and/or its product identifier 708 and any other products 744 and/or their product identifiers 708. In this example, the operation block/module 730 may send a message to the grouping module 722 to identify and/or form a group 724 or licensable unit 724 of related products 726 based on the relationships 720 identified by the relating block/module 718. In one configuration, one of the groups 724 or licensable units 724 may include the new product 744 and/or its product identifier 708.

In another example, the computing device 702 may send information and/or commands to the one or more managed computing devices 740 to obtain the product data 706 for set of all products 744 included in each managed computing device 740. In one configuration, license data 710 will be input into memory 704 as licenses 712 are acquired. The computing device 702 may send a message to the relating block/module 718 to identify all of the relationships 720 between the set of all the product identifiers 708 obtained from the managed computing devices 740 and the set of all licenses 712 that may be in license data 710. Computing device 702 may send a message to the grouping block/module 722 to identify and/or form groups 724 of related products 126 based on the relationships 720 identified by the relating block/module 718.

In one configuration, the systems and methods disclosed herein may be applied to a software license monitoring application (on the computing device 702, for example). This software license monitoring application may use inventory data captured by an inventory component of the computing device 702 (not illustrated in FIG. 7), and may add software license monitoring-specific data to a database accessible to (and accessed by) a broader set of applications. For example, one or more managed computing devices 740 may send inventory data (e.g., products used, licenses used, etc.) to the computing device 702 for monitoring. This inventory data may be stored and/or incorporated into the product data 706 and/or license data 710 by the computing device 702 as discussed above.

Other applications may use the software license monitoring data. However, the software license monitoring application may primarily be a consumer of the inventory data. Automatically identifying and forming groups 724 (e.g., licensable units) of related products 726 may enable identification of groups 724 of related products 726, which must be considered as a whole when performing a compliance calculation.

The users of the software license monitoring application may be concerned with the ethical/legal/financial implications of product usage. For example, the users may want to make sure that they have license seats sufficient to cover the product usage within an organization (or risk having to pay fines when they are audited). Furthermore, they may want to reduce over-licensing (e.g., having purchased a greater quantity or quality of license seats than are used). Consequently, the systems and methods disclosed herein may be useful in multiple places in software license management.

For example, they may be used to facilitate the user's quickly narrowing down the list of products 744 and/or product identifiers 708 (and their respective usages) of concern (either because the manufacturers of such products are prone to conduct audits, or because the costs of licensing the products is high).

The systems and methods disclosed herein may also be used to identify a group 724 of related licenses 728. Identifying related licenses 728 may allow for increased efficiencies in license management.

Figure 8:
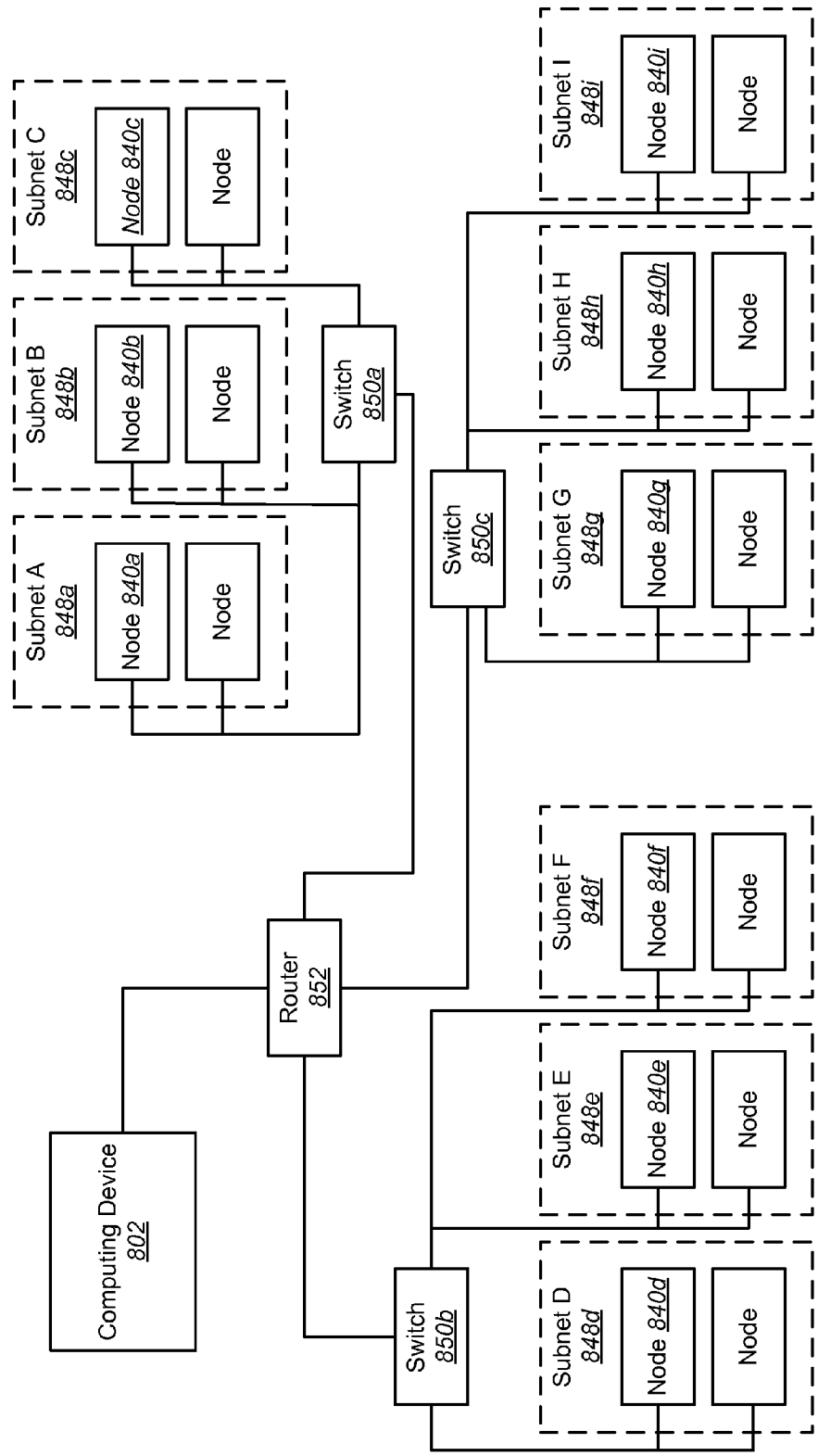
FIG. 8 is a block diagram that illustrates one configuration of a network where systems and methods for determining a group based on a relationship on a computing device may be implemented.

FIG. 8 is a block diagram that illustrates one configuration of a network where systems and methods for determining a group based on a relationship on a computing device 802 may be implemented. A computing device 802 is connected to a router 852. The router 852 is connected to switches 850*a*, 850*b*, 850*c*. Switch 850*a* is connected to several nodes 840*a*, 840*b*, 840*c*, etc., via their respective subnets 848*a*, 848*b*, 848*c*. The switch 850*b* is connected to several nodes 840*d*, 840*e*, 840*f*, etc., via their respective subnets 848*d*, 848*e*, 848*f*. The switch 850*c* is connected to several nodes 840*g*, 840*h*, 840*i*, etc., via their respective subnets 848*g*, 848*h*, 848*i*. In FIG. 8, the nodes 840 may be, for example, managed computing devices 740. Although FIG. 8 only shows one router 852, and a limited number of switches 850, subnets 848, and nodes 840, many and varied numbers of routers 852, switches 850, subnets 848, and nodes 840 may be included in networks and/or systems where systems and methods for determining a group based on a relationship on a computing device may be implemented.

Figure 9:
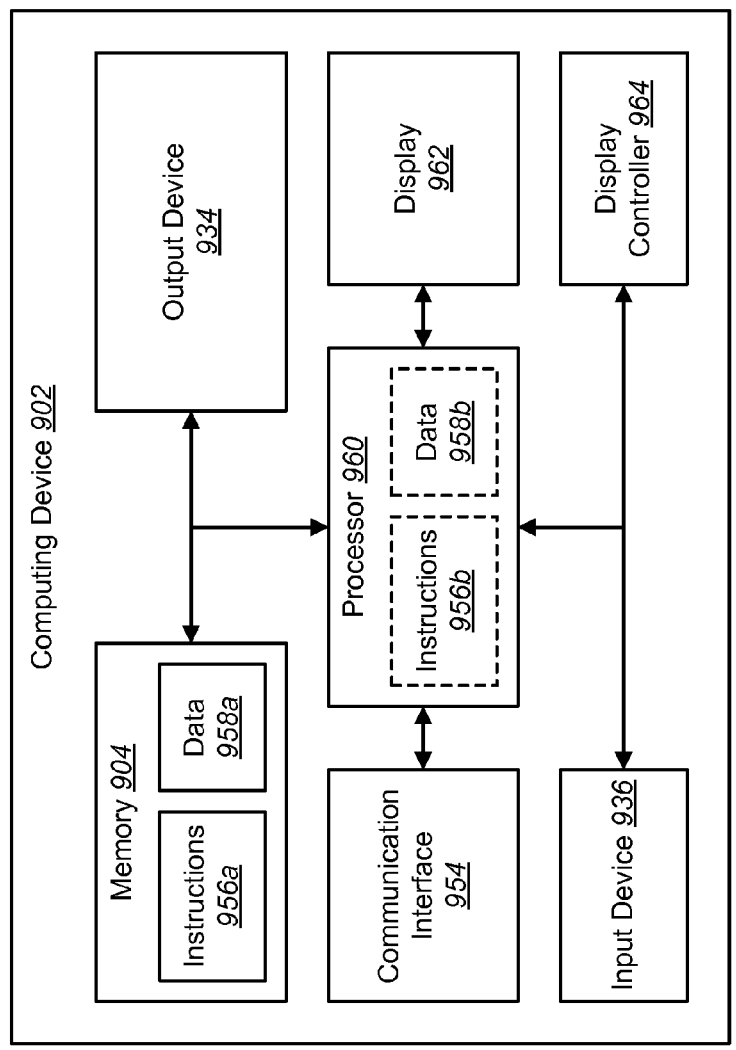
FIG. 9 illustrates various components that may be utilized on a computing device for determining a group based on a relationship.

FIG. 9 illustrates various components that may be utilized on a computing device 902. The computing device 102, 702, 802 and/or managed computing device(s) 740 described above may be configured similar to the computing device 902 illustrated in FIG. 9. For example, the computing device 902 may be configured to perform one or more of the methods 200, 500, 600 described above. The illustrated components may be located within the same physical structure or in separate housings or structures.

The computing device 902 may include a processor 960 and memory 904. The processor 960 controls the operation of the computing device 902 and may be embodied as a microprocessor, a microcontroller, a digital signal processor (DSP) or other device known in the art. The memory 904 may include instructions 956*a* and data 958*a*. The processor 960 typically performs logical and arithmetic operations based on program instructions 956*a* and data 958*a* stored within the memory 904. That is, instructions 956*b* and data 958*b* may be stored and/or run on the processor 960.

The computing device 902 typically may include one or more communication interfaces 954 for communicating with other electronic devices. The communication interfaces 954 may be based on wired communication technology, wireless communication technology, or both. Examples of different types of communication interfaces 954 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 902 typically may include one or more input devices 936 and one or more output devices 934. Examples of different kinds of input devices 936 include a keyboard, mouse, microphone, remote control device, button, joystick, trackball, touchpad, lightpen, etc. Examples of different kinds of output devices 934 include a speaker, printer, etc. One specific type of output device which may be typically included in a computer system is a display device 962. Display devices 962 used with embodiments disclosed herein may utilize any suitable image projection technology, such as a cathode ray tube (CRT), liquid crystal display (LCD), light-emitting diode (LED), gas plasma, electroluminescence, or the like. A display controller 964 may also be provided, for converting data stored in the memory 904 into text, graphics, and/or moving images (as appropriate) shown on the display device 962.

Of course, FIG. 9 illustrates only one possible configuration of a computing device wherein systems and methods for determining a group based on a relationship may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for determining a group of related products, comprising:
   a processor;
   memory in electronic communication with the processor;
   instructions stored in the memory, the instructions being executable to:
      obtain product data that identifies a first product and a second product;
      obtain license data;
      identify a relationship between the first product and the second product based on the license data;
      determine a group of related products based on the relationship, wherein determining the group of related products comprises:
         generating an adjacency matrix for identifying related products; and
         generating a connectivity matrix based on the adjacency matrix; and
      perform an operation based on the group.

2. The computing device of claim 1, wherein performing the operation based on the group comprises performing a compliance calculation based on the group.

3. The computing device of claim 1, wherein the group is a licensable unit.

4. The computing device of claim 1, wherein determining the group of related products further comprises:
   identifying a unique row of the connectivity matrix; and
   forming a distinct group for each unique row of the connectivity matrix.

5. The computing device of claim 1, wherein determining the group of related products further comprises:
   generating a hash set for storing a hash code for each unique row of the connectivity matrix;
   determining if the hash code for a row exists in the hash set;
   adding each unique hash code to the hash set, wherein the hash set identifies each unique row of the connectivity matrix; and
   forming a distinct group for each unique row of the connectivity matrix.

6. The computing device of claim 1, wherein determining the group of related products further comprises:
   sorting the connectivity matrix through row exchanges and corresponding column exchanges to left align values of the connectivity matrix; and
   forming a distinct group for each block of values centered along a main diagonal of the connectivity matrix.

7. The computing device of claim 1, wherein the instructions are further executable to perform a Boolean OR operation on the relationship.

8. A method for determining a group of related products on a computing device, comprising:
   obtaining product data that identifies a first product and a second product;
   obtaining license data;
   identifying, by the computing device, a relationship between the first product and the second product based on the license data;
   determining, by the computing device, a group of related products based on the relationship, wherein determining the group of related products comprises:
      generating an adjacency matrix for identifying related products; and
      generating a connectivity matrix based on the adjacency matrix; and
   performing an operation based on the group.

9. The method of claim 8, wherein performing the operation based on the group comprises performing a compliance calculation based on the group.

10. The method of claim 8, wherein the group is a licensable unit.

11. The method of claim 8, wherein determining the group of related products further comprises:
    identifying a unique row of the connectivity matrix; and
    forming a distinct group for each unique row of the connectivity matrix.

12. The method of claim 8, wherein determining the group of related products further comprises:
   generating a hash set for storing a hash code for each unique row of the connectivity matrix;
   determining if the hash code for a row exists in the hash set;
   adding each unique hash code to the hash set, wherein the hash set identifies each unique row of the connectivity matrix; and
   forming a distinct group for each unique row of the connectivity matrix.

13. The method of claim 8, wherein determining the group of related products based on the relationship further comprises:
   sorting the connectivity matrix through row exchanges and corresponding column exchanges to left align values of the connectivity matrix; and
   forming a distinct group for each block of values centered along a main diagonal of the connectivity matrix.

14. The method of claim 8, wherein the method further comprises performing a Boolean OR operation on the relationship.

15. A non-transitory, tangible computer-readable medium for determining a group of related products, comprising executable instructions for:
   obtaining product data that identifies a first product and a second product;
   obtaining license data;
   identifying a relationship between the first product and the second product based on the license data;
   determining a group of related products based on the relationship, wherein determining the group of related products comprises:
      generating an adjacency matrix for identifying related products; and
      generating a connectivity matrix based on the adjacency matrix; and
   performing an operation based on the group.

16. The computer-readable medium of claim 15, wherein performing the operation based on the group comprises performing a compliance calculation based on the group.

17. The computer-readable medium of claim 15, wherein determining the group of related products further comprises:
   identifying a unique row of the connectivity matrix; and
   forming a distinct group for each unique row of the connectivity matrix.

18. The computer-readable medium of claim 15, wherein determining the group of related products further comprises:
   generating a hash set for storing a hash code for each unique row of the connectivity matrix;
   determining if the hash code for a row exists in the hash set;
   adding each unique hash code to the hash set, wherein the hash set identifies each unique row of the connectivity matrix; and
   forming a distinct group for each unique row of the connectivity matrix.

19. The computer-readable medium of claim 15, wherein determining the group of related products further comprises:
   sorting the connectivity matrix through row exchanges and corresponding column exchanges to left align values of the connectivity matrix; and
   forming a distinct group for each block of values centered along a main diagonal of the connectivity matrix.

20. The computer-readable medium of claim 15, wherein the instructions are further executable to perform a Boolean OR operation on the relationship.

* * * * *